J. M. O'NEALL.
WAGON-BRAKE.

No. 192,275. Patented June 19, 1877.

WITNESSES:
W. W. Hollingsworth
John A. Kernon

INVENTOR:
James M. O'Neall
BY
[signature]
ATTORNEYS.

UNITED STATES PATENT OFFICE.

JAMES M. O'NEALL, OF FORT WORTH, TEXAS.

IMPROVEMENT IN WAGON-BRAKES.

Specification forming part of Letters Patent No. 192,275, dated June 19, 1877; application filed May 14, 1877.

*To all whom it may concern:*

Be it known that I, JAMES M. O'NEALL, of Fort Worth, in the county of Tarrant and State of Texas, have invented a new and Improved Buggy-Brake; and I do hereby declare that the following is a full, clear, and exact description of the same.

My improved brake is designed to be attached to the under side of a buggy or wagon body in such manner that it may be operated by the foot of the driver applied to the bent arm of a lever, projecting up through a slot in the bed or floor. The said lever has a sector-shaped toothed portion, which meshes with a toothed sliding rack-bar, that is immediately connected with and operates the brake-levers proper, as hereinafter described.

Figure 1:
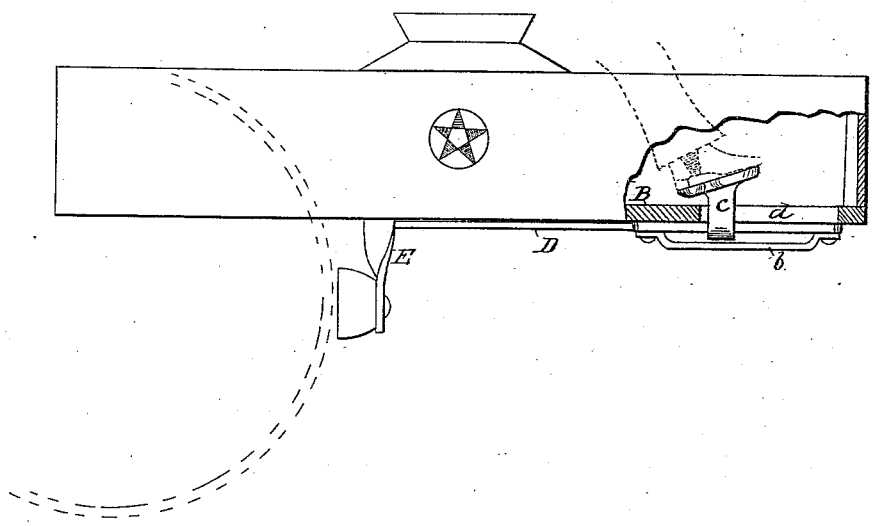
Figure 2:
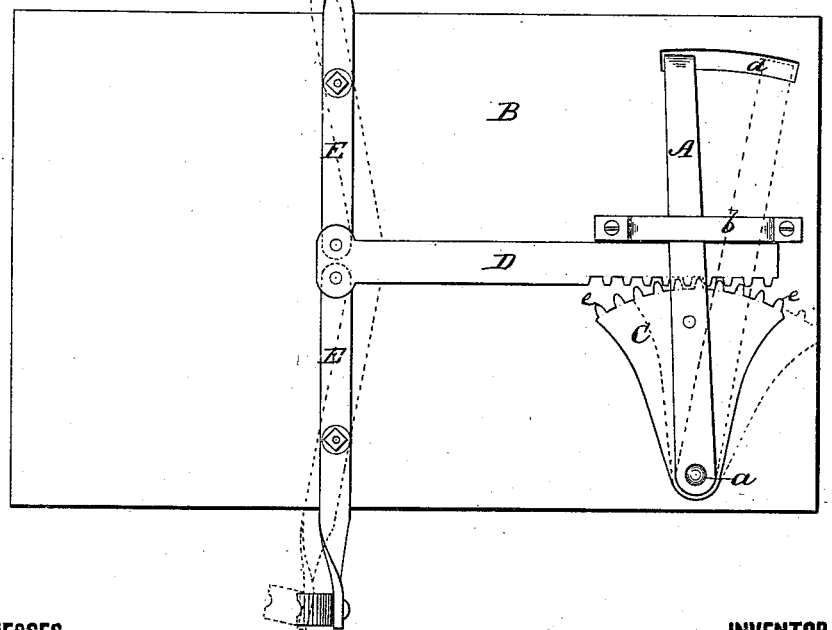

In the accompanying drawing, forming part of this specification, Figure 1 is a side elevation of a buggy-body (part being broken out) having my improvement attached. Fig. 2 is a bottom-plan view of the same.

The foot-lever A is arranged transversely of the buggy, pivoted at $a$, and works in a slotted guide, $b$. Its free end $c$ is bent upward, and projects through the slot $d$ in the bottom B of the buggy or wagon, in such manner that the foot of the driver may be conveniently applied to it. The lever A is attached to, or else formed in one piece with, the sector-shaped piece C, which is also pivoted at the same point $a$, and provided with teeth $e$ on its curved outer side. The sector C meshes with the rack-bar D, which is placed lengthwise of the floor B, and has a flexible connection with the inner ends of the pivoted brake-levers E. The bar D slides in frictional contact with the guide $b$, and is thus held engaged with the sector C.

All the parts above named, composing the brake mechanism, lie in the same horizontal plane, and parallel to the bottom B of the buggy or wagon, excepting only the curved end $c$ of lever A.

To operate the brake, the driver applies his foot to the part $c$, and pushes it forward in the slot $d$. The toothed sector C necessarily partakes of the movement of lever A, and thus the rack-bar is caused to slide forward and draw the inner ends of the brake-levers E in the same direction, so that the brake-shoes are applied to the wheels with a force and effect corresponding to the pressure exerted by the driver on the lever A.

This arrangement of brake mechanism obviates several objections to the use of lever-brakes on buggies, since the parts are out of the way, and not noticeable or prominently visible from the sides of the vehicle.

What I claim is—

The foot-lever A, having an upwardly-curved end, $c$, the toothed sector C, the guide $b$, the sliding rack-bar D, and the pivoted brake-levers E, attached to the under side of a buggy or wagon body, having the slot $d$, all combined, substantially as shown and described, to operate as specified.

JAMES MADISON O'NEALL.

Witnesses:
J. J. MILLER,
SOLON C. KEMON.